United States Patent Office 3,417,183
Patented Dec. 17, 1968

3,417,183
17-ETHERS OF ESTRADIOL
Alberto Ercoli, Milan, and Rinaldo Gardi, Carate Brianza, Milan, Italy, assignors, by mesne assignments, to Warner-Lambert Pharmaceutical Company, Morris Plains, N.J., a corporation of Delaware
No Drawing. Filed May 2, 1966, Ser. No. 546,506
Claims priority, application Italy, June 4, 1965, 12,593/65
17 Claims. (Cl. 424—243)

The invention is concerned with new steroid derivatives and with the preparation thereof.

The new compounds according to the present invention are 17-ethers of estradiol of the general formula:

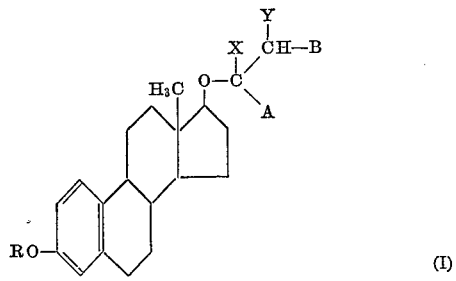

(I)

wherein R represents a hydrogen atom or an alkanoyl radical containing from 1 to 10 carbon atoms, X represents a lower alkoxy radical, Y represents a hydrogen atom or X and Y together form a C—C bond, A and B, which may be the same or different, represent hydrogen atoms or lower alkyl radicals, cycloalkyl radicals containing five or six carbon atoms, arylalkyl radicals containing from seven to nine carbon atoms or phenyl radicals or A and B together represent a divalent hydrocarbon chain of three or four carbon atoms, i.e. a propylene (—CH$_2$—CH$_2$—CH$_2$—) or butylene (—CH$_2$—CH$_2$—CH$_2$—CH$_2$—)

radical.

The term "lower alkyl" as used herein includes alkyl radicals containing from 1 to 5 carbon atoms, preferably methyl, ethyl, propyl, isopropyl, n-amyl and iso-amyl and the term "lower alkoxy" preferably means methoxy or ethoxy.

The new 17-ethers of estradiol of the present invention, which are characterised by having an etherified sec-hydroxyl group at the 17β-position, possess valuable claudogenic and estrogenic activity.

In contradistinction to estradiol and its 3-esters, which have a very poor oral activity, the new compounds of the present invention possess high estrogenic activity also when administered orally. In addition, they are of greater value when compared with the orally active 17α-substituted derivatives, such as 17α-methyl or -ethynyl-estradiol, because of non-physiologically active methyl or ethynyl groups are not present in the 17-position. In particular, the compounds of the present invention, compared with 17α-ethynyl-estradiol, have the advantage that they do not give rise to side effects when administered orally. For example, in contradistinction to the known estrogens, they do not cause nausea and are, therefore, suitable for prolonged treatment.

Preferred compounds of the present invention are those of general Formula I wherein A and B together represent a propylene or butylene radical, R represents an alkanoyl radical containing from 1 to 5 carbon atoms and X and Y have the above meanings. A particularly preferred compound is the 17-cyclohex-1'-enyl ether of estradiol 3-propionate.

These compounds show a remarkable estrogenic activity, at least equal to that of 17α-ethynyl-estradiol, which has hitherto been considered the most potent estrogen for oral administration.

Furthermore, these new compounds, when given parenterally, have a protracted estrogenic action and, in this way, they also appear to be more active than ethynyl-estradiol; i.e. the 17-cyclohex-1'-enyl ether of estradiol 3-propionate appears to be about twice as active as ethynyl-estradiol.

The new 17-ethers of estradiol of the present invention may be formulated into pharmaceutical compositions for oral use, mixed with any solid or liquid pharmaceutical carrier which is not incompatible with the active material. Such compositions may take the form of tablets, powders, capsules, syrups or other dosage forms particularly suitable for oral administration.

When the active material is mixed with any of the diluents and/or tabletting adjuvants used in pharmaceutical practice, it is advisable to stabilise the compositions by adding suitable buffer substances or, alternatively, an alkaline substance (for example an alkali metal hydroxide or carbonate or an organic base) in order to prevent the 17-ethers of estradiol from hydrolysing, since these active ingredients may dissociate in an acidic medium to give the corresponding free 17β-hydroxy compound, which is less effective as an oral hormone. The compositions can also be suitably coated in order to protect them from the action of gastric juice or introduced, alone or mixed with suitable diluents or stabilising agents, into gelatine capsules or any other enteric-resistant material which acts as a solid carrier.

Preferred pharmaceutical carriers in the compositions according to the present invention are orally ingestible oils, fats, waxes, fatty acids or phospholipids of animal or vegetable origin and preferably having a high coefficient of digestibility.

When administered parenterally, the compounds can be associated with the carriers usually employed for preparing vials, such as glycols or oils.

The new compounds of the present invention are administered in compositions containing from 0.01 to 100 mg., preferably from 0.05 to 25 mg., of compound per dosage unit. These compositions may be employed for estrogenic treatments and may also be used for the maintenance of pregnancy in females. Generally, daily dosages of from about 0.05 to about 50 mg. of active compound are effective in preventing abortion.

The compositions can also contain other therepeutically useful substances, for example, natural or synthetic hormones having androgenic, anabolic or progestational activity.

Particularly useful compositions can be prepared by mixing a compound of the present invention, for example the 17-cyclohex-1'-enyl ether of estradiol 3-propionate with progestational compounds which are orally active, for example, 3 - cyclopentyloxy-Δ$^{3,5}$-pregnadien-20-one, 3 - cyclopentyloxy - 17α - acetoxy-Δ$^{3,5}$-pregnadien-20-one, 3-cyclopentyloxy - 17α - ethynyl-19-nor-Δ$^{3,5}$-androstadien-17β - ol acetate, 6α-methyl-17α-acetoxyprogesterone, 6-chloro - 6-dehydro-17α-acetoxyprogesterone, 17α-ethynyl-19-nortestosterone and the 17-acetate thereof, 17α-ethynyl-19 - nor - Δ$^{5(10)}$ - androsten - 17β - ol-3-one 17-acetate or 17α - ethynyl - 19 - nor-Δ$^{5(10)}$androstene-3β,17β-diol diacetate.

Particularly advantageous mixtures are those of the 17 - cyclohex - 1' - enyl ether of estradiol 3 - propionate with 3 - cyclopentyloxy - 17α - ethynyl - 19 - nor-Δ$^{3,5}$-androstadien-17β-ol acetate and with 3 - cyclopentyloxy-Δ$^{3,5}$ - pregnadien - 20 -one, which may be used in the control of fertility.

The new 17-ethers of estradiol can be obtained by reacting a 3-ester of estradiol of the general formula:

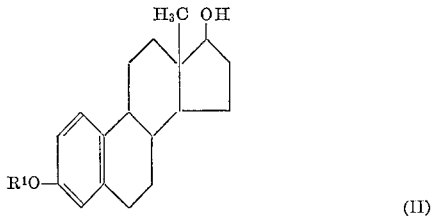

wherein $R^1$ represents an alkanoyl group containing from 1 to 10 carbon atoms, with a functional derivative of a carbonyl compound of the general formula:

wherein A and B have the same meaning as above, and thereafter hydrolysing, if desired, the 3-positioned ester group in an alkaline medium.

The term "functional derivatives" means the typical derivatives of the carbonyl compounds, particularly aldehydes and ketones, with lower aliphatic alcohols, i.e. lower alkyl acetals, hemiacetals or lower alkyl enol ethers. Such functional derivatives can be prepared according to known methods, i.e. by treating the aldeheyde or ketone with an appropriate lower alkyl orthoformate. Suitable functional derivatives are the lower alkyl enol ethers and the lower dialkyl acetals or mixtures thereof, the methyl and ethyl enol ethers and/or dimethyl and diethyl acetals being preferred.

The preferred carbonyl compounds of general Formula III are cyclopentanone and cyclohexanone.

The reaction between the estradiol 3-ester and the functional derivatives of the carbonyl compound is usually carried out by mixing the reactants in the presence or absence of solvents and/or acid catalysts.

As solvents there may be used methylene chloride, chloroform, petroleum ether, hexane, diethyl ether, tert.-butanol, benzene, toluene, dioxan, tetrahydrofuran, dimethyl formamide or mixtures thereof.

The acid catalyst is preferably a strong organic acid or a salt of a strong acid with an organic base, for example, p-toluene-sulphonic acid, benzene-sulphonic acid, pyridine hydrochloride or pyridine p-toluene-sulphonate.

The product resulting from the reaction can be isolated by simple filtration or by eliminating the solvent and by recrystallising the residue in the usual manner.

As final product, there is obtained a compound of general Formula I, wherein R represents an alkanoyl group containing from 1 to 10 carbon atoms, A and B are as defined above and X and Y represent a lower alkoxy radical and a hydrogen atom respectively, or together form a C—C bond.

The obtaining of compounds wherein X represents a lower alkoxy radical and Y is a hydrogen atom or wherein X and Y together form a double bond, depends on the operating conditions and, particularly, on the temperature.

By treating an estradiol 3-ester with a functional derivative of an aldehyde or ketone of general Formula III and operating at a temperature lower than 70° C., preferably in an organic solvent and in the presence of a catalyst, an exchange of radicals with the elimination of a mole of lower alcohol occurs when a lower dialkyl acetal is used as functional derivative or a simple addition takes place when a lower alkyl enol ether is employed as functional derivative. Thus, a compound of general Formula I is obtained where X represents a lower alkoxy radical and Y is a hydrogen atom.

Alternatively, by treating the estradiol 3-ester with a functional derivative of an aldehyde or a ketone of general Formula III and operating at a temperature higher than 70–80° C., an exchange of radicals occurs, with the elimination of one or two moles of lower alcohol according to whether a lower alkyl enol ether or a lower dialkylacetal, respectively, is employed as functional derivative. Thus, a compound of general Formula I is obtained wherein X and Y together form a double bond.

Since, in preparing these compounds, a double bond forms between the carbon atom of the carbonyl and one or the other of the adjacent methylene groups, the result is that, when an asymmetric reagent, particularly an asymmetric lower dialkylacetal, is used, there is obtained a mixture of two products which differ from one another in the position of the double bond. For example, by treating an estradiol 3-ester with a lower dialkyl acetal of hexan-3-one a 17 - (1' - n - propylprop - 1 ' - enyl) ether of estradiol 3 - ester (Formula I, A=n. propyl; B=methyl) is obtained in admixture with a 17(1'-ethyl-but-1'-enyl) ether (Formula I, A=B=ethyl). Both the isomers are within the scope of the present invention.

The subsequent hydrolysis is accomplished by treating the estradiol 3-ester-17-ether with an aqueous solution of an alkali, for example, sodium or potassium hydroxide or sodium or potassium carbonate. Under such alkaline conditions, the ether group at the 17-position is stable, while the acyloxy group at the 3-position is converted into a hydroxy group, thus providing a compound of general Formula I wherein R is a hydrogen atom.

The following examples are given for the purpose of illustrating the present invention.

EXAMPLE 1

1 g. estradiol 3-propionate in 2 cc. tert.-butanol is reacted with 1 cc. cyclopentanone methyl enol ether and 10 mg. p-toluene-sulphonic acid. After a few minutes, a crystalline product precipitates which, after crystallisation from a mixture of methanol-methylene chloride, gives the 17-(1'-methoxy-cyclopentyl) ether of estradiol-3-propionate; M.P. 81–83° C.; $[\alpha]_D^{22}=+44.5°$ (dioxan, c.= 0.5%). Similarly, the 17-(1'-methoxy-cyclopentyl) ether of estradiol 3-acetate is prepared; M.P. 89–91° C.; $[\alpha]_D^{22}=+49.5°$ (dioxan, c.=0.5%). This product (0.5 g.), dissolved in 25 cc. methanol, is boiled under reflux for 2 hours with a 0.1 N solution of sodium hydroxide. The reaction mixtures gives, upon concentration, a residue which, crystallised from a mixture of methanol-methylene chloride, consists of the 17-(1'-methoxy-cyclopentyl) ether of estradiol; M.P. 127–129° C.; $[\alpha]_D^{22}=+50°$ (dioxan, c.=0.5%).

EXAMPLE 2

To a solution of 1 g. estradiol 3-propionate in 2 cc. tert.-butanol, there is added 1 cc. cyclohexanone methyl enol ether and 10 mg. pyridine p-toluene-sulphonate. The resulting mixture is allowed to stand overnight, after which 0.95 g. of the low-melting 17-(1'-methoxy-cyclohexyl) ether of estradiol 3-propionate is obtained; $[\alpha]_D^{22}=+49°$ (dioxan, c.=0.5%).

In the same manner, the 17-(1'-methoxy-cyclohexyl) ether of estradiol 3-acetate is obtained; M.P. 79–82° C.; $[\alpha]_D^{22}=+51.5°$ (dioxan, c.=0.5%). By alkaline hydrolysis, as in Example 1, the 3-acetate derivative is converted to the 17-(1'-methoxy-cyclohexyl) ether of estradiol; M.P. 108–110° C.; $[\alpha]_D^{22}=+53.5°$ (dioxan, c.=0.5%).

EXAMPLE 3

3 g. estradiol 3-propionate are treated with 5 cc. cyclopentanone diethyl-acetal. The mixture is heated for 60 minutes at 180–200° C., then neutralized with a few drops of pyridine and concentrated to dryness under vacuum. The reside, recrystallised from methanol, yields the 17-(cyclopent-1'-enyl) ether of estradiol 3-propionate; M.P. 91–93° C.; $[\alpha]_D^{22}=+61.5°$ (dioxan, c.=0.5%). Similarly, the 17-(cyclopent-1'-enyl) ether of estradiol-3-acetate; M.P. 126–128° C.; $[\alpha]_D^{22}=+65°$ (dioxan, c.= 0.5%), and the 17-(cyclopent-1'enyl)ether of estradiol- 3-valerate; oil, $[\alpha]_D^{22}=+53.5°$ (dioxan, c.=0.5%), are prepared.

1.5 g. of the 17-(cyclopent-1'-enyl) ether of estradiol-3-propionate, dissolved in 50 cc. methanol, are heated for 2 hours with 0.5 g. potassium carbonate in 5 cc. water. By concentrating the solution to dryness and purifying the residue from methanol, there is obtained 17-(cyclopent-1'-enyl) ether of estradiol; M.P. 73–76° C.; $[\alpha]_D^{22}=+66.5°$ (dioxan, c.=0.5%).

The same product may be obtained by the alkaline hydrolysis of the 17-(cyclopent-1'-enyl) ether of estradiol 3-acetate or 3-valerate.

EXAMPLE 4

A mixture of 2 g. estradiol 3-propionate, 3 cc. cyclohexanone dimethyl-acetal, 20 mg. pyridine p-toluene-sulphonate and 3 cc. dimethyl formamide is heated for 60 minutes at a temperature of 180–190° C. The reaction mixture is then neutralised with a few drops of pyridine and concentrated to dryness under vacuum. The residue, taken up with a mixture of methylene chloride-methanol, yields the 17-(cyclohex-1'-enyl) ether of estradiol 3-propionate; M.P. 94–96° C.; $[\alpha]_D^{22}=+71°$ (dioxan, c.=0.5%).

Similarly, the 17-(cyclohex-1'-enyl) ether of estradiol 3-acetate; M.P. 114–116° C.; $[\alpha]_D^{22}=+75°$ (dioxan, c.=0.5%), and the 17-(cyclohex-1'-enyl) ether of estradiol-3-valerate; oil; $[\alpha]_D^{22}=+62.5°$ (dioxan, c.=0.5%), are prepared.

2 g. of the 17-(cyclohex-1'-enyl) ether of estradiol 3-propionate, hydrolysed with sodium hydroxide in methanol solution as in Example 1, yields the 17-(cyclohex-1'-enyl) ether of estradiol; M.P. 87–90° C.; $[\alpha]_D^{22}=+75.5°$ (dioxan, c.=0.5%).

EXAMPLE 5

To a solution of 1 g. methyl ethyl ketone dimethyl acetal and 3 mg. p-toluene-sulphonic acid in 5 cc. tert.-butanol, there is added 1 g. estradiol 3-propionate. After standing overnight at room temperature, the precipitate is recrystallised from a mixture of methylene chloride-methanol to obtain the 17-(1'-methoxy-1'-methyl-propyl) ether of estradiol 3-propionate; M.P. 64–68° C.; $[\alpha]_D^{22}=+62°$ (dioxan, c.=0.5%).

Similarly, the 17-(1'-methoxy-1'-methyl-propyl) ether of estradiol 3-acetate is obtained; M.P. 53–57° C.; $[\alpha]_D^{22}=+64°$ (dioxan, c.=0.5%). Hydrolysis of this product with sodium hydroxide as in Example 1, yields the 17-(1'-methoxy-1'-methyl-propyl) ether of estradiol; M.P. 109–113° C.; $[\alpha]_D^{22}=+67.5°$ (dioxan, c.=0.5).

EXAMPLE 6

By operating according to Example 1, 2 or 5, by treating estradiol 3-acetate with the diethyl acetals of acetaldehyde and acetone the following compounds are prepared: 17-(1'-ethoxy-ethyl) ether of estradiol 3-acetate; 17-(1'-ethoxy-1'-methyl-ethyl) ether of estradiol 3-acetate.

Similarly, by treating estradiol 3-acetate with the dimethyl acetals of pentan-3-one, cyclopentyl ethyl ketone, cyclohexyl ethyl ketone, cyclohexyl acetone, 1-cyclohexyl-butan-2-one, cyclohexyl isopropyl ketone, cyclohexyl isobutyl ketone, cyclohexyl hexahydrobenzyl ketone, phenyl ethyl ketone, pentan-2-one, hexan-3-one, heptan-2-one, decan-5-one and undecan-6-one, the following compounds are obtained:

17-(1'-methoxy-1'-ethyl-propyl) ether,
17-(1'-methoxy-1'-cyclopentyl-propyl) ether,
17-(1'-methoxy-1'-cyclohexyl-propyl) ether,
17-(1'-methoxy-1'-hexahydrobenzyl-ethyl) ether,
17-(1'-methoxy-1'-hexahydrobenzyl-propyl) ether,
17-(1'-methoxy-1'-cyclohexyl-isobutyl) ether,
17-(1'-methoxy-1'-cyclohexyl-3'-methyl-butyl) ether,
17-(1'-methoxy-1',2',dicyclohexyl-ethyl) ether,
17-(1'-methoxy-1'-phenyl-propyl) ether,
17-(1'-methoxy-1'-methyl-butyl) ether,
17-(1'-methoxy-1'-ethyl-butyl) ether,
17-(1'-methoxy-1'-methyl-n-hexyl) ether,
17-(1'-methoxy-1'-n-butyl-n-hexyl) ether and
17-(1'-methoxy-1'-n-pentyl-n-hexyl) ether of estradiol-3-acetate which can be converted by hydrolysis in an alkaline medium into the corresponding 17-ether of estradiol.

EXAMPLE 7

To a solution of 1.3 g. capronaldehyde methyl enol ether and 3 mg. benzene-sulphonic acid in 5 cc. tert.-butanol, there is added 1 g. estradiol 3-propionate. By operating as in Example 5, the 17-(1'-methoxy-n-hexyl) ether of estradiol 3-propionate is obtained.

By subjecting this compound to hydrolysis with sodium hydroxide as in Example 1, the 17-(1'-methoxy-n-hexyl) ether of estradiol is obtained.

Similarly, by reacting cyclohexyl acetaldehyde ethyl enol ether with estradiol 3-caproate, the 17-(1'-ethoxy-2'-cyclohexyl-ethyl) ether of estradiol 3-caproate is obtained, which can be converted into the 17-(1'-ethoxy-2'-cyclohexyl-ethyl) ether of estradiol.

EXAMPLE 8

By operating according to Example 1, 2 or 5, by treating estradiol 3-oenanthate with dibenzyl ketone dimethyl acetal, the 17 - (1' - methoxy-1'-benzyl-2'-phenyl-ethyl) ether of estradiol 3-oenanthate is obtained.

Similarly, the 17 - (1' - methoxy-1',2'-dibenzyl-ethyl) ether, the 17 - (1'-methoxy-1'-hexahydrobenzyl-2'-cyclohexyl-ethyl) ether and the 17-(1'-methoxy-1',2'-dihexahydrobenzyl-ethyl) ether are prepared.

EXAMPLE 9

By operating according to Example 3 or 4, by treating estradiol 3-acetate with caproaldehyde and phenyl ethyl ketone dimethyl acetals, the following compounds are prepared: the 17-(hex-1'-enyl) ether of estradiol 3-acetate, and the 17-(1'-phenyl-prop-1'-enyl) ether of estradiol 3-acetate.

Similarly, by treating estradiol 3-acetate with the dimethyl acetals of cyclopentyl ethyl ketone, cyclohexyl, ethyl ketone, cyclopentyl acetone, cyclohexyl isopropyl ketone, cyclohexyl isobutyl ketone and cyclohexyl hexahydrobenzyl ketone, the following compounds are obtained:

17-(1'-cyclopentyl-prop-1'-enyl) ether,
17-(1'-cyclohexyl-prop-1'-enyl) ether,
17-(1'-methyl-2'-cyclopentyl-vinyl) ether,
17(1'-cyclohexyl-2'-methyl-prop-1'-enyl) ether,
17-(1'-cyclohexyl-3'-methyl-but-1'-enyl) ether and
17-(1',2'-dicyclohexyl-vinyl) ether of estradiol 3-acetate, which can be converted by hydrolysis in an alkaline medium into the corresponding 17-ethers of estradiol.

EXAMPLE 10

A mixture of 2 g. estradiol 3-propionate, 3 cc. pentan-3-one dimethyl acetal, 15 mg. p-toluene-sulphonic acid and 3 cc. dimethyl formamide is heated for 60 minutes at a temperature of 180–190° C. By operating as in Example 4, the 17-(1'-ethyl-prop-1'-enyl) ether of estradiol 3-propionate is obtained.

By subjecting this compound to hydrolysis with sodium hydroxide as in Example 1, the 17-(1'-ethyl-prop-1'-enyl) ether of estradiol is obtained.

Similarly, by reacting estradiol 3-propionate with undecan-6-one and dibenzyl ketone dimethyl acetals, the 17-(1'-n-pentyl-hex-1'-enyl) ether and 17-(1'-benzyl-styryl) ether of estradiol 3-propionate are obtained, respectively, which can be converted by alkaline hydrolysis into the corresponding 17-ethers of estradiol.

EXAMPLE 11

3 g. estradiol 3-acetate are reacted with 5 cc. hexan-3-one diethyl acetal. The mixture is heated for 60 minutes at 180–200° C., then neutralised with a few drops of pyridine and concentrated to dryness under vacuum. The residue, recrystallised from methanol, yields a 17-hexenyl ether of estradiol 3-acetate in the form of a mixture of the 17-(1'-propyl-prop-1'-enyl) ether and the 17-(1'-ethyl-but-1'-enyl) ether. Similarly, a 17-heptenyl ether of estradiol 3-acetate is obtained in the form of a mixture of the 17-(1'-methyl-hex-1'-enyl) ether and of the 17-(1'-n-pentyl-vinyl) ether, and a 17-decenyl ether of estradiol 3-acetate is obtained in the form of a mixture of the 17-(1'-butyl-n-hex-1'-enyl) ether and of the 17-(1'-n-pentyl-n-pent-1'-enyl) ether.

EXAMPLE 12

By operating according to Example 11 and treating estradiol 3-acetate with 1-phenyl-butan-2-one dimethyl acetal, there is obtained a mixture of the 17-(1'-ethyl-2'-phenyl-vinyl) ether and of the 17-(1'-benzyl-prop-1'-enyl) ether of estradiol 3-acetate.

Similarly, a mixture of the 17-(1'-ethyl-2'-cyclohexyl-vinyl) ether and of the 17-(1'-hexahydrobenzyl-prop-1'-enyl) ether of estradiol 3-acetate is obtained.

EXAMPLE 13

A mixture of 2 g. estradiol 3-valerate, 3 g. 1.4-diphenyl-butan-2-one dimethyl acetal, 20 mg. pyridine p-toluene-sulphonate and 3 cc. dimethyl formamide is heated for 60 minutes at a temperature of 180–190° C.

By operating as in Example 4, a mixture of the 17-(1'-benzyl-3'-phenyl-prop-1'-enyl) ether and of the 17-(1'-phenetyl-styryl) ether of estradiol 3-valerate is obtained.

Similarly, by treating estradiol 3-valerate with 1,4-dicyclohexyl-butan-2-one dimethyl acetal, a mixture of the 17-(1'-hexahydrobenzyl-3'-cyclohexyl-prop-1'-enyl) ether and of the 17-(1'-hexahydrophenetyl-2'-cyclohexyl-vinyl) ether of estradiol 3-valerate is obtained.

EXAMPLE 14

To a solution of 1.3 g. cyclohexan acetaldehyde dimethyl acetal and 3 mg. benzene-sulphonic acid in 5 cc. dimethyl formamide, there is added 1 g. estradiol-3-propionate. By operating as in Example 4, the 17-(2'-cyclohexyl-vinyl) ether of estradiol-3-propionate is obtained.

Similarly, by reacting estradiol 3-propionate with 1,3-dicyclohexyl acetone dimethyl acetal, the 17-(1'-hexahydrobenzyl-2'-cyclohexyl-vinyl) ether of estradiol-3-propionate is obtained and converted, by alkaline hydrolysis, into 17-(1'-hexahydrobenzyl-2'-cyclohexyl-vinyl) ether of estradiol.

EXAMPLE 15

Following the same procedure as described in Examples 1 and 2 and treating 1 g. estradiol 3-propionate in 2 cc. tert.-butanol with 1 cc. cyclopentanone ethyl enol ether in the presence of 10 mg. p-toluene-sulphonic acid, the 17-(1'-ethoxy-cyclopentyl) ether of estradiol 3-propionate is obtained.

Similarly, by treating estradiol 3-propionate with cyclohexanone ethyl enol ether, the 17-(1'-ethoxy-cyclohexyl) ether of estradiol 3-propionate is prepared.

EXAMPLE 16

50 mg. of the 17-(cyclohex-1'-enyl) ether of estradiol 3-propionate are dissolved in one litre of a mixture (1:1) of sesame oil and olive oil. The limpid and homogeneous solution is introduced into 0.2 cc. gelatine capsule, so that each capsule contains exactly 0.01 mg. of active substance.

EXAMPLE 17

Tablets for oral use, having the following composition, are prepared:

| | Mg. |
|---|---|
| 17-(1'-methoxy-cyclohexyl) ether of estradiol 3-proprionate | 0.025 |
| Sodium bicarbonate | 113.225 |
| Cellulose | 19.000 |
| Gum arabic | 7.250 |
| Talc | 5.000 |
| Magnesium stearate | 5.500 |
| | 150 |

The active substance is mixed with the sodium bicarbonate, the gum arabic and a part of the cellulose and granulated with a 10% aqueous solution of the remaining cellulose. It is then dried at a temperature below 40° C. When the granules are thoroughly dried, the talc and magnesium stearate are added and the mixture is compressed into tablets.

EXAMPLE 18

An oily composition suitable for oral administration, comprising one estrogenic and one progestinic substance, is prepared by dissolving, in 1 litre of a mixture of sesame oil and olive oil, 37.5 mg. of the 17-(cyclohex-1'-enyl) ether of estradiol 3-propionate and 250 mg. of 3-cyclopentyloxy - 17α - ethynyl-19-nor-$\Delta^{3,5}$-androstadien-17β-ol-acetate.

The solution is then introduced into 0.2 cc. gelatine capsules so that each capsule contains 0.075 mg. of the 17-(cyclohex-1'-enyl) ether of estradiol 3-propionate and 0.5 mg. 3-cyclopentyloxy-17α-ethynyl-19-nor-$\Delta^{3,5}$-androstadien-17β-ol acetate.

EXAMPLE 19

In the same manner as described in Example 18, 0.2 cc. gelatine capsules containing 0.1 mg. of the 17-(cyclohex-1'-enyl) ether of estradiol 3-propionate and 50 mg. of 3-cyclopentyloxy-$\Delta^{3,5}$-pregnadien-20-one are prepared.

We claim:

1. A compound of the formula:

$$\begin{array}{c}\text{Y}\\|\\\text{X}-\text{CH}-\text{B}\\\text{H}_3\text{C}\quad\text{O}-\text{C}\\\diagdown\text{A}\end{array}$$

in which R is selected from the group consisting of hydrogen and alkanoyl radicals up to 10 carbon atoms; A and B are selected from the group consisting of hydrogen, lower alkyl, cycloalkyl of from 5 to 6 carbon atoms, aralkyl of from 7 to 9 carbon atoms, phenyl, and, together with each other 1,3-propylene and 1,4-butylene; X is lower alkoxy; Y is hydrogen and X and Y together form a C—C bond.

2. A compound as claimed in claim 1, in which R is an alkanoyl radical up to 5 carbon toms, X is lower alkoxy, Y is hydrogen and A and B, together with each other, are selected from the group consisting of 1,3-propylene and 1,4-butylene.

3. A compound as claimed in claim 1 in which R is an alkanoyl radical up to 5 carbon atoms, X and Y together form a C—C bond and A and B, together with each other, are selected from the group consisting of 1,3-propylene and 1,4-butylene.

4. 17-(cyclohex-1'-enyl) ether of estradiol 3-propionate.

5. 17-(cyclohex-1'-enyl) ether of estradiol 3-acetate.
6. 17-(cyclopent-1'-enyl) ether of estradiol 3-valerate.
7. 17-(cyclohex-1'-enyl) ether of estradiol 3-valerate.
8. 17-(cyclohex-1'-enyl) ether of estradiol.
9. 17-(1'-methoxy-cyclopentyl) ether of estradiol 3-acetate.
10. 17-(1'-methoxy-cyclohexyl) ether of estradiol 3-acetate.
11. 17-(1'-methoxy-cyclohexyl) ether of estradiol 3-propionate.
12. 17-(1'-ethoxy-cyclopentyl) ether of estradiol 3-propionate.
13. 17-(1'-ethoxy-cyclohexyl) ether of estradiol 3-propionate.
14. A pharmaceutical composition in dosage unit form comprising in admixture with a pharmaceutical acceptable carrier, from 0.01 mg. to 100 mg. of a compound having the formula:

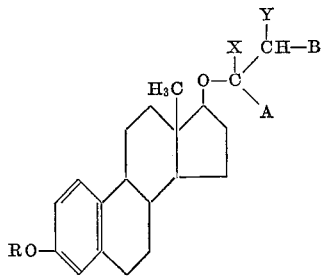

in which R is selected from the group consisting of hydrogen and alkanoyl radicals up to 10 carbon atoms; A and B are selected from the group consisting of hydrogen, lower alkyl, cycloalkyl of from 5 to 6 carbon atoms, aralkyl of from 7 to 9 carbon atoms, phenyl, and, together with each other, 1,3-propylene and 1,4-butylene; X is lower alkoxy; Y is hydrogen and X and Y together form a C—C bond.

15. A composition as claimed in claim 14 containing from 0.05 mg. to 25 mg. of said steroid compound.

16. A pharmaceutical composition in dosage unit form comprising from 0.05 mg. to 25 mg. of 17-(cyclohex-1'-enyl) ether of estradiol 3-propionate, in admixture with a pharmaceutical acceptable carrier.

17. A composition as claimed in claim 16 which also includes a progestational hormone selected from the group consisting of 3-cyclopentyloxy-$\Delta^{3,5}$-pregnadien-20-one and 3 - cyclopentyloxyl-17$\alpha$-ethynyl-19-nor-$\Delta^{3,5}$-androstadien-17$\beta$-ol acetate.

References Cited

UNITED STATES PATENTS 3,135,744  6/1964  Ercoli et al.
3,242,198  3/1966  Ercoli et al.

H. A. FRENCH, *Primary Examiner.*

U.S. Cl. X.R.

260—397.5; 424—239